(12) United States Patent
Oh et al.

(10) Patent No.: US 10,703,208 B2
(45) Date of Patent: Jul. 7, 2020

(54) BRAKING CONTROL SYSTEM AND METHOD FOR ECO-FRIENDLY VEHICLE

(71) Applicants: Hyundai Motor Company, Seoul (KR); Kia Motors Corporation, Seoul (KR)

(72) Inventors: Ji Won Oh, Gyeonggi-do (KR); Young Joon Chang, Gyeonggi-do (KR); Jeong Soo Eo, Gyeonggi-do (KR); Youn Kwang Jung, Gyeonggi-Do (KR); Sung Jae Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/195,038

(22) Filed: Nov. 19, 2018

(65) Prior Publication Data
US 2019/0193569 A1  Jun. 27, 2019

(30) Foreign Application Priority Data

Dec. 22, 2017 (KR) .......................... 10-2017-0177711

(51) Int. Cl.
*B60L 7/26* (2006.01)
*B60T 8/17* (2006.01)
(Continued)

(52) U.S. Cl.
CPC ........ *B60L 7/26* (2013.01); *B60T 1/10* (2013.01); *B60T 8/17* (2013.01); *B60T 8/40* (2013.01);
(Continued)

(58) Field of Classification Search
CPC ...... B60L 7/26; B60T 1/10; B60T 8/17; B60T 8/40; B60T 13/662; B60T 13/667;
(Continued)

(56) References Cited

U.S. PATENT DOCUMENTS

| | | | |
|---|---|---|---|
| 2013/0131901 A1* | 5/2013 | Yamagata | B60L 7/18 701/22 |
| 2016/0121728 A1* | 5/2016 | Huh | B60L 7/26 701/70 |
| 2018/0015830 A1* | 1/2018 | Brouwer | B60L 7/26 |

FOREIGN PATENT DOCUMENTS

KR   10-1724802 B1   4/2017

* cited by examiner

*Primary Examiner* — Marthe Y Marc-Coleman
(74) *Attorney, Agent, or Firm* — Mintz Levin Cohn Ferris Glovsky and Popeo, P.C.; Peter F. Corless (57) ABSTRACT

A braking control system and a method for an eco-friendly vehicle are provided to resolve discrepancy in braking force occurring during switching between hydraulic braking and regenerative braking. The system includes a deceleration determiner that determines target and actual decelerations of the vehicle based on collected information when braking and a torque calculator that calculates target and actual deceleration torques from the determined target and actual decelerations of the vehicle using vehicle equivalent inertia information. An error calculator calculates a torque error and a torque corrector corrects a pre-correction target regenerative braking torque by the calculated torque error and calculates a post-correction target regenerative braking torque. A motor controller adjusts a regenerative braking torque of a motor according to the calculated post-correction target regenerative braking torque.

18 Claims, 4 Drawing Sheets

(51) Int. Cl.
*B60T 13/66* (2006.01)
*B60T 1/10* (2006.01)
*F16D 61/00* (2006.01)
*B60T 8/40* (2006.01)
*B60W 40/107* (2012.01)
*B60W 30/18* (2012.01)
*B60W 20/00* (2016.01)
*B60W 10/192* (2012.01)
*B60W 10/188* (2012.01)

(52) U.S. Cl.
CPC .......... *B60T 13/662* (2013.01); *B60T 13/667* (2013.01); *B60W 10/188* (2013.01); *B60W 10/192* (2013.01); *B60W 20/00* (2013.01); *B60W 30/18127* (2013.01); *B60W 40/107* (2013.01); *F16D 61/00* (2013.01); *B60L 2240/14* (2013.01); *B60T 2270/60* (2013.01); *B60T 2270/604* (2013.01); *B60W 2520/105* (2013.01); *B60W 2710/18* (2013.01); *B60W 2720/106* (2013.01)

(58) Field of Classification Search
CPC .......... B60T 2270/60; B60T 2270/604; B60W 10/188; B60W 10/192; B60W 20/00; B60W 30/18127; B60W 40/107; B60W 2520/105; B60W 2710/18; B60W 2720/106; F16D 61/00
USPC .......................................................... 701/70
See application file for complete search history.

BRAKING CONTROL SYSTEM AND METHOD FOR ECO-FRIENDLY VEHICLE

CROSS-REFERENCE TO RELATED APPLICATION

This application claims under 35 U.S.C. § 119(a) the benefit of priority to Korean Patent Application No. 10-2017-0177711 filed on Dec. 22, 2017, the entire contents of which are incorporated herein by reference.

BACKGROUND

(a) Technical Field

The present disclosure relates to a braking control system and a braking control method for eco-friendly vehicle, and more particularly, to a braking control system and a braking control method for an eco-friendly vehicle, which are capable of resolving discrepancy in braking force occurring in the process of switching between hydraulic braking and regenerative braking when braking.

(b) Background Art

Generally, for an eco-friendly vehicle such as a hybrid electric vehicle (HEV), an electric vehicle (EV), or a fuel cell electric vehicle (FCEV), which travels using an electric motor as a driving source, regenerative braking in which kinetic energy of the vehicle is recovered as electric energy through electric power generation of the electric motor to charge a battery is performed when braking. Regenerative braking converts kinetic energy of a vehicle into electric energy using a motor connected to a driving wheel, the electric energy is stored in a battery, and the stored electric energy is reused to drive the motor when the vehicle is being driven, thereby contributing to improvement in fuel efficiency of the vehicle.

A vehicle in which regenerative braking is performed requires a regenerative braking cooperative control technique for equalizing the sum of a regenerative braking torque (e.g., a regenerative braking force) generated at a motor and a frictional braking torque (e.g., a frictional braking force) generated at a frictional braking device with a total braking torque (e.g., a target braking force) required by a brake manipulation of a driver. At this point, it is necessary to appropriately distribute the regenerative braking force which is an electrical braking force resulting from electric power generation and rotational resistance of the motor, and the frictional braking force resulting from the frictional braking device, and accordingly, a cooperative control should be appropriately performed between controllers.

A hydraulic braking device is used as a general frictional braking device, and when a target braking force which is a braking force required by a driver is calculated based on a brake signal that corresponds to a brake manipulation of the driver (a braking input of the driver), e.g., a signal of a brake pedal sensor (BPS) according to a manipulation of a brake pedal, a regenerative braking force and a hydraulic braking force (e.g., a frictional braking force) are distributed to satisfy the target braking force. Further, when the regenerative braking force (e.g., a regenerative braking torque) and the hydraulic braking force (e.g., a hydraulic braking torque) are determined through the distribution of the braking forces, the motor performs a regenerative braking control and a hydraulic braking control to provide the distributed braking forces.

However, discrepancy in braking force in the process of switching between frictional braking and regenerative braking in an eco-friendly vehicle such as a hybrid vehicle may occur when braking the vehicle. More specifically, even in a driver braking input state, that is, when a user braking manipulation state is not significantly changed and there is no significant variation in required vehicle deceleration required or total braking force (target braking force), a regenerative braking force is gradually increased while a hydraulic braking force is gradually decreased and thus there are many occurrences of a braking force cross situation in which a magnitude of the hydraulic braking force becomes less than that of the regenerative braking force. There are also many occurrences of a braking force cross situation in which the hydraulic braking force is gradually increased while the regenerative braking force is gradually decreased and thus the magnitude of the regenerative braking force becomes smaller less that of the hydraulic braking force.

As described above, a vehicle which is decelerating by performing regenerative braking through a motor that is a torque generating device based on a vehicle speed and a transmission state may reduce a regenerative braking force and, simultaneously, generate and increase a frictional braking force to change a braking force source. Further, a vehicle which is decelerating by performing frictional braking may reduce the frictional braking force and, simultaneously, generate and increase the regenerative braking force to change the braking force source.

For example, in a vehicle performing regenerative braking, a braking force cross is generated even at an initial time when braking begins according to a brake operation of a driver, at an end time of braking, and while a gear shifts, and during a cruise control for automatically controlling a speed of a vehicle. Further, when the driver strongly engages a brake pedal, control may be performed such that the hydraulic braking force is largely generated and then is gradually decreased, and the regenerative braking force is gradually increased to satisfy a required braking force.

At this point, when the driver does not significantly change a brake pedal manipulation amount (e.g., a brake pedal depth or a brake pedal stroke), a braking force which is blended in a situation in which the hydraulic braking force is reduced and the regenerative braking force is increased, that is, a total braking force generated in the vehicle should also be maintained without a significant change. Optimally, a control should be performed such that a braking force generated by the hydraulic braking is converted into an equivalent regenerative braking force and thus a total amount of braking is maintained constant and only a braking force source is changed.

Contrarily, the control should be optimally performed such that a braking force generated by the regenerative braking is converted into an equivalent frictional braking force and thus the total amount of braking is maintained constant and only the braking force source is changed. However, it may be difficult to accurately control the friction braking due to various environmental variables and to accurately generate a desired friction braking force.

In other words, a regenerative braking control through a motor is an electrical control, and thus the regenerative braking control may perform with a relatively high accuracy and have superior convergence on a target value of a torque control, thereby accurately generating and adjusting a regenerative braking torque. On the other hand, since many control variables are present, a hydraulic braking control has accuracy that is relatively lower than that of the regenerative braking control and has a difficulty in accurate control and generation of a braking torque.

Specifically, since the hydraulic braking control should perform control of a flow and a pressure of brake fluid through a valve, there are many variables affecting a valve characteristic as well as control results such as a master cylinder pressure and a transient state characteristic of a pressure in a hydraulic line in comparison with the regenerative braking control. Further, since a friction pad of a caliper should squeeze a brake disk by rubbing therewith to generate a braking force, environmental variables such as a friction coefficient, a temperature, humidity, and the like significantly affect braking making a braking force difficult to accurately control.

Therefore, although a brake pedal input of the driver is maintained constant, the braking force generated at the vehicle is instantaneously varied, and thus a discomfort deceleration change occurs frequently. A developed related art technology discloses a braking control method for an eco-friendly vehicle, which is capable of securing braking linearity and resolving degradation in braking reliability due to environmental conditions in a hybrid vehicle.

Although the above-described related art document discloses a method of correcting a frictional braking force control based on the information obtained through a temperature sensor and a humidity sensor, there is a limitation on this method which is not capable of flexibly responding to a variation on a friction surface and a variation in size and thickness of a moisture particle. Further, even though an elaborate frictional force model for a temperature and humidity is present, it is not possible to effectively respond to all situations and thus, correction is necessarily performed through feedback.

In addition to the above-described braking control method, there is known a method of compensating for an error of a hydraulic braking force by learning a relationship between a hydraulic pressure and a hydraulic braking torque based on a longitudinal acceleration sensor of a vehicle. However, owing to a characteristic of a system in which a plurality of hydraulic braking control logics should be made through learning and, even in the hydraulic braking control logic changed by the learning, a hydraulic pressure should be subject to the same process in which the hydraulic pressure is converted into a torque through a hydraulic line, a control error is present in the above-described method and thus, there is a limitation in that all convergences of a control are unable to be satisfied.

The above information disclosed in this section is merely for enhancement of understanding of the background of the invention and therefore it may contain information that does not form the prior art that is already known in this country to a person of ordinary skill in the art.

SUMMARY

The present invention has been made in an effort to solve the above-described problems associated with prior art. In one aspect, the present invention provides a braking control system and a braking control method for an eco-friendly vehicle, which are capable of resolving discrepancy in braking force occurring in the process of switching between hydraulic braking and regenerative braking when braking.

In an exemplary embodiment, a braking control system for an eco-friendly vehicle may include a deceleration determiner configured to determine target deceleration and actual deceleration of the eco-friendly vehicle based on information collected in the eco-friendly vehicle when braking, a torque calculator configured to calculate a target deceleration torque and an actual deceleration torque from the determined target deceleration and the determined actual deceleration of the eco-friendly vehicle using vehicle equivalent inertia information, an error calculator configured to calculate a torque error which is a difference value between the target deceleration torque and the actual deceleration torque, a torque corrector configured to correct a pre-correction target regenerative braking torque by the calculated torque error and calculate a post-correction target regenerative braking torque, and a motor controller configured to adjust a regenerative braking torque of a motor according to the calculated post-correction target regenerative braking torque.

In another exemplary embodiment, a braking control method for an eco-friendly vehicle may include determining target deceleration and actual deceleration of the eco-friendly vehicle based on collected in the eco-friendly vehicle when braking, calculating a target deceleration torque and an actual deceleration torque from the determined target deceleration and the determined actual deceleration of the eco-friendly vehicle using vehicle equivalent inertia information, calculating a torque error which is a difference value between the target deceleration torque and the actual deceleration torque, correcting a pre-correction target regenerative braking torque by the calculated torque error and calculating a post-correction target regenerative braking torque, and adjusting a regenerative braking torque of a motor based on the calculated post-correction target regenerative braking torque.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be fully described in a detail which is suitable for implementation by those skilled in the art with reference to the accompanying drawings. However, the present invention is not limited to the exemplary embodiment disclosed herein and may be implemented in other forms.

The present invention relates to a braking control system and a braking control method for an eco-friendly vehicle in which a motor is used for a vehicle being driven and regenerative braking and hydraulic braking are performed. The present invention relates to a braking control system and a braking control method for an eco-friendly vehicle, which is capable of resolving discrepancy in braking force occurring in a braking process of the eco-friendly vehicle, e.g., occurring when a switching between hydraulic braking and regenerative braking is performed at a low vehicle speed immediately before stopping.

Further, the present invention relates to acceleration-based regenerative braking torque control (i.e., motor torque control when braking) for compensating for a dynamic characteristic of a hydraulic braking force of an eco-friendly vehicle, and in order to prevent degradation in driving ability due to discrepancy in braking force under a braking cross situation, the present invention adjusts a regenerative braking torque of a motor and compensates for an error of hydraulic braking to reduce an impact when braking and deceleration.

The present invention also performs feedback for an environmental variable using a measured wheel speed value and a measured vehicle acceleration value and compensates for an error between an actual hydraulic braking torque and a target hydraulic braking torque in real-time through regenerative braking control of a motor, such that a switching between regenerative braking and hydraulic braking (crossing of braking forces is performed) is performed while maintaining constant deceleration of a vehicle without undesired discomfort deceleration. In addition, the present invention performs correction of a motor torque to compensate for an error of hydraulic braking to prevent a discomfort vehicle deceleration feel change, generation of an impact, an abrupt variation in a braking force, generation of discomfort braking feel, and degradation of driving ability when deceleration.

As described above, to overcome inaccuracy of hydraulic braking control and low responsiveness of hydraulic control due to a variable, the present invention has an advantage of using only motor control as well as being capable of correcting a braking force error of a relatively high frequency. The motor control is electrical control such that more accurate control is possible, rapid control is possible due to superior responsiveness for control, and a regenerative braking torque may be generated more accurately due to superior convergence on a target value of torque control. Therefore, in the present invention, a control logic is configured to compensate for an error of hydraulic braking through motor torque control.

Further, the above-described braking control process of the present invention may be performed under cooperative control performed between a plurality of controllers within a vehicle. A vehicle controller (e.g., a hybrid control unit (HCU) or a vehicle control unit (VCU)) may be mounted within an eco-friendly vehicle as a high-level controller configured to execute an entire vehicle operation, and various controllers may also be mounted therein to operate various devices.

For example, a brake controller (e.g., a brake control unit (BCU) or an integrated brake actuation unit (iBAU)) may be configured to perform braking control of a vehicle and operate a hydraulic braking device, a motor controller (e.g., a motor control unit (MCU)) may be configured to operate a motor, a transmission controller (e.g., a transmission control unit (TCU)) may be configured to operate a transmission, and a battery controller (e.g., a battery management system (BMS)) may be configured to collect battery state information and manage a battery, and the like.

The controllers may be configured to perform cooperative control while exchanging information with each other via a vehicle network for vehicle braking, and similarly, the cooperative control may be applied to perform braking control according to the present invention. In other words, the braking control process according to the present invention may also be performed by cooperative control between the vehicle controller (the HCU) and other controllers.

However, in the braking control process according to the present invention, the vehicle controller (e.g., the HCU) may be configured to obtain predetermined specific information that indicates a vehicle state when braking, use the obtained information as feedback information, and calculate and apply a motor torque command for compensating for an error of a hydraulic braking torque in real-time based on the feedback information, such that control for compensating for the hydraulic braking torque may be performed with a motor torque.

Figure 1:
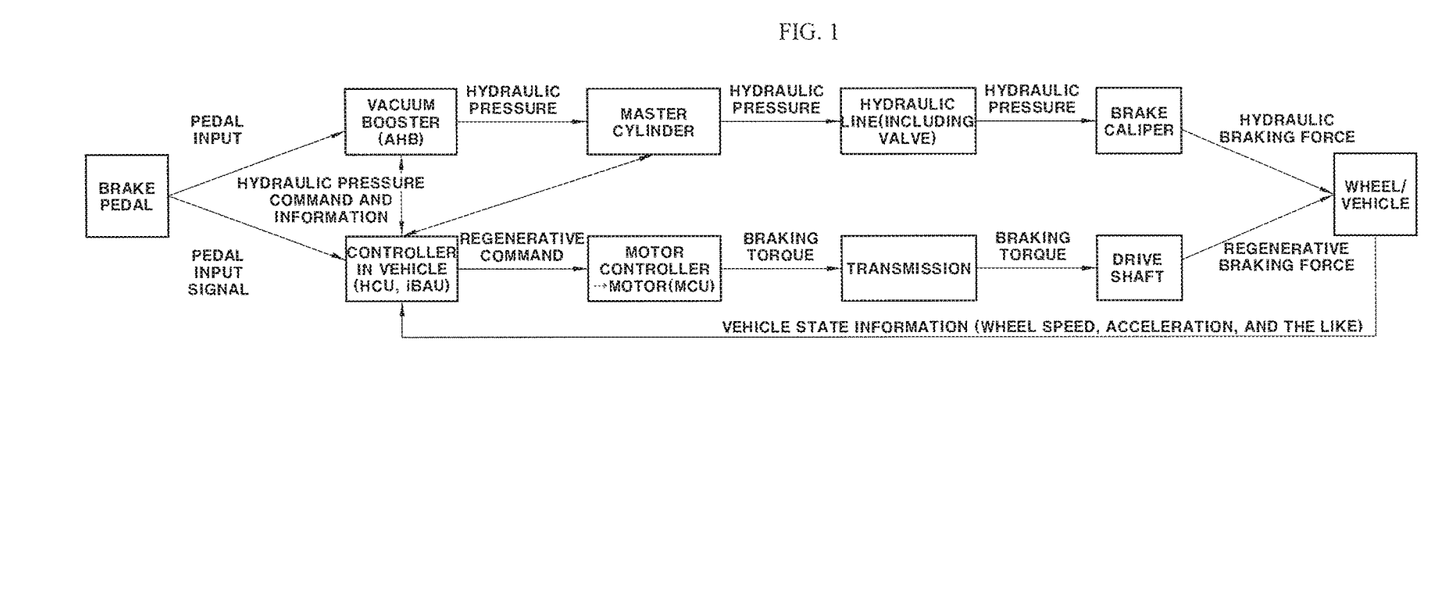
FIG. 1 is a diagram for describing a braking force generation flow in a vehicle in which a braking control process according to an exemplary embodiment of the present invention is performed.

FIG. 1 is a diagram for describing a braking force generation flow in a vehicle in which a braking control process of the present invention is performed, and a description will be described with reference to FIG. 1. First, as shown in FIG. 1, the braking control process according to the present invention may initiate when a driver engages a brake pedal. When the brake pedal is engaged, that is, when a driver brake pedal input (e.g., a driver braking input) occurs, the pedal input may be detected by a sensor and then a pedal input signal that indicates a driver braking request may be transmitted from the sensor to a controller within a vehicle.

A total amount of braking required by a driver (e.g., driver requested amount of braking) may be determined by a controller within the vehicle, e.g., the iBAU, based on the pedal input signal that is input from the sensor. Further, when a regenerative command, that is, a regenerative braking torque command (e.g., a motor torque command) for the motor is calculated under the cooperative control between the controllers including the vehicle controller (e.g., the HCU) and the brake controller (e.g., the iBAU), the motor controller (e.g., the MCU) may be configured to adjust a motor torque to generate a required regenerative braking torque based on the calculated command.

Furthermore, the controller may be configured to receive information regarding a vehicle speed and vehicle acceleration, which is vehicle state information obtained in real-time, and use this information as feedback information to compensate for an error of a hydraulic braking force. In particular, the vehicle acceleration may include both positive acceleration and deceleration (e.g., a negative value). Consequently, the regenerative braking torque generated at the motor may be transmitted to a wheel through a transmission and a drive shaft to act as a braking force on the wheel to thus decelerate the vehicle.

Simultaneously, when a hydraulic pressure is generated by a vacuum booster and a master cylinder according to a driver pedal input to generate the hydraulic braking torque and then the hydraulic pressure is supplied to a brake caliper disposed at each wheel in a state of being controlled by a valve while passing through a hydraulic line, the hydraulic braking force may be generated at each wheel of the vehicle due to clamping of the brake caliper, i.e. friction between a pad and a disc. Particularly, the vacuum booster may be an active hydraulic booster (AHB). Thus, the regenerative braking force may be generated by the motor and the hydraulic braking force may be generated by the hydraulic braking device to satisfy a total braking force required by the driver.

Figure 2:
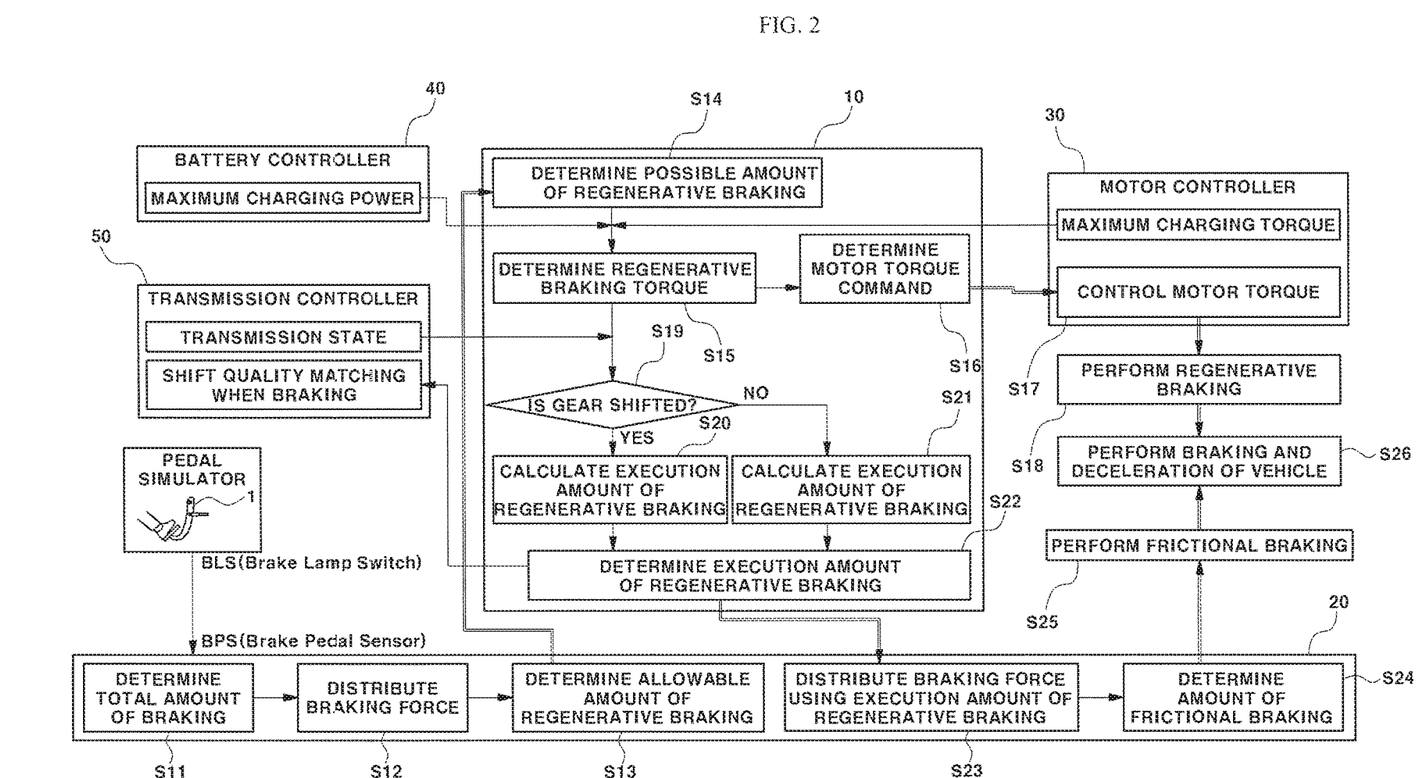
FIG. 2 is a diagram illustrating a cooperative control process between controllers in an eco-friendly vehicle when braking according to an exemplary embodiment of the present invention.

Although the cooperative control process between the controllers for braking has not been described in detail above, a cooperative control process performed in the eco-friendly vehicle will be described in more detail below with reference to FIG. 2. When the driver manipulates a brake pedal 1, a total amount of braking may be determined in a brake controller (iBAU) 20 configured to receive a pedal input signal (S11), and the brake controller 20 may be configured to determine an allowable amount of regenerative braking from the total amount of braking using braking force distribution (S12) and transmit the allowable amount of regenerative braking to a vehicle controller (HCU) 10 (S13). In particular, the pedal input signal may be a sensor signal based on a driver brake pedal manipulation state, and the sensor may be a conventional brake pedal sensor (BPS) configured to detect an amount of a brake pedal manipulation (e.g., a brake pedal depth or a brake pedal stroke).

Further, the vehicle controller (HCU) 10 may be configured to determine a possible amount of the regenerative braking according to a vehicle state based on the received allowable amount of regenerative braking (S14), determine a regenerative braking torque from the allowable amount of regenerative braking based on information regarding maximum charging power (e.g., possible battery charging power) received from a battery controller (BMS) 40 and information regarding a maximum charging torque (e.g., a possible motor charging torque) received from a motor controller (MCU) 30 (S15), and determine a motor torque command from the regenerative braking torque to transmit the motor torque command to the motor controller 30 (S16). The motor controller 30 may then be configured to adjust a motor torque through an inverter based on the motor torque command (e.g., a regenerative braking torque command) received from the vehicle controller 10 (S17), thereby performing regenerative braking (S18).

Together with the performing of the regenerative braking, hydraulic braking control may be performed by the braking controller 20, and the vehicle controller 10 may be configured to calculate and determine an execution amount of regenerative braking from the regenerative braking torque based on a transmission state using transmission state information received from a transmission controller 50 (S19, S20, and S21). Further, when the execution amount of regenerative braking is determined, the vehicle controller 10 may be configured to transmit the execution amount of regenerative braking to the brake controller 20, and the brake controller 20 may be configured to determine an amount of frictional braking (e.g., an amount of hydraulic braking) through the braking force distribution using the execution amount of regenerative braking received from the vehicle controller 10 (S23 and S24).

The brake controller 20 may then be configured to determine the amount of frictional braking (e.g., the amount of hydraulic braking) by subtracting the execution amount of regenerative braking received from the vehicle controller 10 from the total amount of braking. Thus, the brake controller 20 may be configured to operate a frictional braking device (e.g., the hydraulic braking device) to generate a braking force corresponding to the finally determined amount of frictional braking, thereby performing frictional braking (S25). Consequently, braking and deceleration of the vehicle, which satisfy a total braking force (e.g., the total amount of braking) requested by the driver, may be performed with the regenerative braking force generated by the motor and the frictional braking force (e.g., the hydraulic braking force) generated by the frictional braking device (e.g., the hydraulic braking device) (S26).

As described above, the plurality of controllers may be configured to perform the cooperative control to execute the braking and deceleration of the vehicle, and in the above-described cooperative control process, the total amount of braking, the allowable amount of regenerative braking, the possible amount of regenerative braking, and the execution amount of regenerative braking may be torque values.

Meanwhile, in addition to the cooperative control process of the controllers for braking of the vehicle, that is, the above-described cooperative control process, a process of compensating for an error of hydraulic braking using feedback information is added to the present invention. A configuration in the vehicle controller (the HCU) configured to perform an additional hydraulic braking error compensation logic will be described below, and the hydraulic braking error compensation logic is a newly added configuration in the vehicle controller in the present invention.

Figure 3:
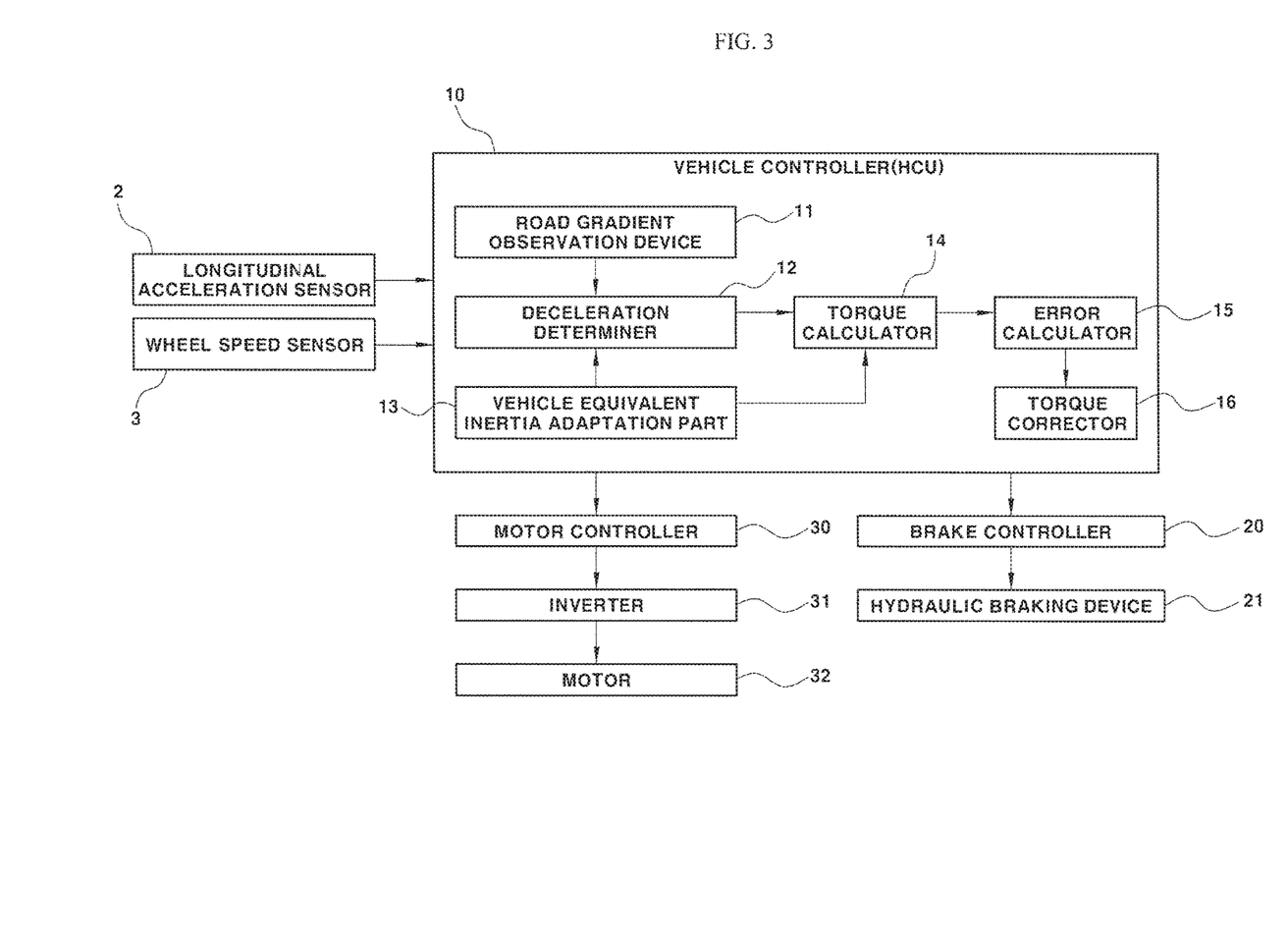
FIG. 3 is a block diagram of a configuration for performing the braking control process according to an exemplary embodiment of the present invention.

FIG. 3 is a block diagram of a configuration in the vehicle controller for performing the braking control process of the present invention. In the present invention, the vehicle controller 10 may include a vehicle state observation part, a deceleration determiner 12, a torque calculator 14, an error calculator 15, and a torque corrector 16, and the vehicle state observation part may include a gradient information acquisition part (e.g., road gradient observation device or sensor) 11 and a vehicle equivalent inertia adaptation part 13.

First, to perform correction through the regenerative braking force, gradient information regarding a road is required, and thus the gradient information acquisition part 11 may be configured to acquire the gradient information of the road on which the vehicle is being driven. When the gradient information of the road is absent, a variation in braking force due to a road gradient may be misrecognized as a braking force error, and thus erroneous or unnecessary correction may be performed due to such misrecognition.

To prevent the aforementioned, the present invention may use the gradient information of the road, and as one example, when a vehicle stops on an ascendant road within about four seconds under the same condition in which the vehicle stops on a flat ground within about five seconds. Accordingly, this provides an indication that an ascendant gradient acts on the vehicle as an equivalent deceleration torque to allow the vehicle to stop more rapidly.

Thus, when the correction is performed when the gradient information of the road is not provided without consideration of the road gradient, typically the vehicle controller 10 would additionally generate an acceleration torque to make the vehicle stop within the same five seconds, and this behavior is not preferable. However, when the gradient information of the road is used, the above-described problem may be resolved.

Various methods for acquiring in real-time the gradient information of the road on which the vehicle is being driven in the vehicle are known, and as an example, there are known a method using a sensor, a method of designing an appropriate observation device and acquiring gradient information of a road from the designed observation device, a method of using geographical information such as global positioning system (GPS) information and three-dimensional (3D) map data, a method of using information provided from a navigation device, and the like.

As an example among the above-described method, the road gradient observation device 11 may be configured to receive a measured longitudinal acceleration value of the vehicle and a measured wheel speed value as inputs. In particular, the longitudinal acceleration value of the vehicle may be measured by a longitudinal acceleration sensor 2, and the wheel speed value may be measured by a wheel speed sensor 3. Since a conventional longitudinal acceleration sensor is configured to measure a value obtained by adding acceleration and deceleration components of the vehicle to an inclination component thereof, only the acceleration and deceleration components of the vehicle may be obtained by removing the inclination component of the vehicle from a measured value of the conventional longitudinal acceleration sensor.

Based on the above-described principle, when a measured longitudinal acceleration value-based wheel speed observation device designed for defining an inclination component of an unknown vehicle and converging on a measured wheel speed value is provided, a total amount of feedback for converging on the measured wheel speed value derived from the wheel speed observation device corresponds to an inclination value of the unknown vehicle. Using such principle for a vehicle inclination estimation, the road gradient may be observed.

Further, since the measured value of the longitudinal acceleration sensor 2 is real-time information reflecting the acceleration and deceleration of the vehicle and the inclination thereof, and the measured value of the wheel speed sensor 3 is information reflecting the acceleration and deceleration of the vehicle, when a value corresponding to the acceleration and deceleration of the vehicle is subtracted from the measured value of the longitudinal acceleration sensor 2 using the measured value of the wheel speed sensor 3, the gradient information of the road, which is a value corresponding to the inclination of the vehicle, may be obtained and thus the road gradient observation device 11 may be configured according to the above-described manner to acquire the gradient information of the road in real-time.

Moreover, in the present invention, a deceleration determiner 12 may be configured to determine target deceleration and actual deceleration based on information collected from the vehicle when braking. In other words, the target deceleration of the vehicle and the actual deceleration thereof may be determined by the deceleration determiner 12, and the deceleration determiner 12 may be configured to directly receive the measured value of the longitudinal acceleration sensor 2 and then determine the actual deceleration of the vehicle from the measured value received from the longitudinal acceleration sensor 2.

Alternatively, the deceleration determiner 12 may be configured to determine the actual deceleration of the vehicle, which corresponds to wheel acceleration, wherein the wheel acceleration may be obtained by differentiating the wheel speed which is the measured value of the wheel speed sensor 3. At this point, an appropriate low pass filter (not shown) may be applied to reduce a noise component which may occur in the above-described process.

The target deceleration of the vehicle may be calculated by the vehicle controller 10 based on the hydraulic braking torque command and the regenerative braking torque command which are determined when braking, and alternatively, the target deceleration of the vehicle may be determined by reflecting the gradient information of the road which is acquired through the gradient information acquisition part (e.g., road gradient observation device) 11. In particular, the hydraulic braking torque command may be a torque command that corresponds to the amount of frictional braking in the operation S24 of FIG. 2, and the regenerative braking torque command may be the motor torque command in the operation S16 of FIG. 2.

The target deceleration of the vehicle may be obtained based on a basic expression of "summed amount of total torques applied to wheels of vehicle=equivalent inertia of vehicle and wheels×wheel acceleration," the summed amount of the total torques may be obtained using values of the commands, and the equivalent inertia may be obtained by the vehicle equivalent inertia adaptation part 13 which will be described below. More specifically, the target deceleration of the vehicle may be converted from target wheel deceleration, the target wheel deceleration may be the wheel acceleration obtained based on the above-described equation, and when the wheel acceleration is determined based on the above-described equation, the target deceleration of the vehicle may be determined from the determined wheel acceleration.

The summed amount of the total torques may be calculated using a target hydraulic braking torque value serving as a hydraulic braking torque command value and a target regenerative braking torque value serving as a regenerative braking torque command value. Additionally, model values that correspond to torques applied to the wheels may be obtained and used to calculate the summed amount of the total torques. The model values may include the target hydraulic braking torque value, the target regenerative braking torque value, a modeled rolling resistance torque value, a modeled air resistance torque value, and a gradient resistance torque value may be used. As known, resistance acting on a moving vehicle may be represented as a force value and may be obtained as the sum of rolling resistance, air resistance, and gradient resistance.

A method of calculating the rolling resistance, the air resistance, and the gradient resistance is well known to those skilled in the art, and thus a detailed description thereof will be omitted. For example, gradient resistance Rg may be calculated by an equation of "$Rg=m \cdot g \cdot \sin \theta$" wherein, m represents a mass of the vehicle, g represents acceleration of gravity, and $\theta$ represents a road gradient, and a value estimated in the road gradient observation device 11 may be used to calculate the gradient resistance as the road gradient.

Further, the rolling resistance torque, the air resistance torque, and the gradient resistance torque are represented by torque values corresponding to the rolling resistance, the air resistance, and the gradient resistance, and therefore, a summed value of all the rolling resistance torque, the air resistance torque, the gradient resistance torque, the target regenerative braking torque, and the target hydraulic braking torque is a total summed torque applied to the wheels of the vehicle, that is, the summed amount of the total torques in the above-described equation.

An advantage of this control method is that the target deceleration of the vehicle may be adjusted and set to a desired value, and thus braking feel before stopping may be variously adjusted in a desired form. The vehicle equivalent inertia adaptation part 13 may then be configured to acquire equivalent inertia information. The target deceleration and the actual deceleration of the vehicle, which previously calculated, may be converted into the target deceleration torque and the actual deceleration torque, respectively since a correction torque may be calculated when torque information is provided.

A relationship between deceleration and a torque may be determined by equivalent inertia of the vehicle, and since the equivalent inertia is a variable according to a vehicle weight, an adaptation type learning process which reflects real-time information of an actual vehicle is required. In other words, the vehicle equivalent inertia adaptation part 13 may be configured to perform learning of adaptively calculating the equivalent inertia of the vehicle using the real-time information collected from the actual vehicle. The adaptation type learning process may be performed based on a relationship of "equivalent inertia variation=vehicle target deceleration−vehicle actual deceleration," and this is separately performed when a correction torque intervenes.

The real-time information collected in the vehicle may include the determined target deceleration and the determined actual deceleration of the vehicle and may further include state information for determining a condition for which correction of the braking torque is not performed, and the state information may be a ratio of the regenerative braking force. In the present invention, when the adaptation type learning process is performed, correction of the braking torque is not performed. Accordingly, the adaptation type learning process may be performed only when a ratio of the regenerative braking force, in which the hydraulic braking force is not mixed, is 1 (the hydraulic braking force is 0, i.e., the regenerative braking force is 100% and the hydraulic braking force is 0%) to thus prevent degradation of accuracy of the adaptation type learning process due to the error of the hydraulic braking force.

As described above, when the ratio of the regenerative braking force is 1, that is, when only the regenerative braking satisfies the braking force without the hydraulic braking, adaptation of the equivalent inertia value may be performed, and this condition may be applied to a determination of whether the adaptation type learning process is performed but not applied to torque control for correcting a braking, and torque correction may always be performed during deceleration. Since the regenerative braking torque information substantially coincides with the actual regenerative braking torque, this adaptation strategy is appropriate.

Further, a torque calculator 14 may be configured to calculate the target deceleration torque and the actual deceleration torque from the target deceleration and the actual deceleration of the vehicle using the vehicle equivalent inertia information obtained as described above. At this point, the torque calculator 14 may be configured to multiply the target deceleration of the vehicle by the equivalent inertia to convert the target deceleration into the target deceleration torque, and in addition, the torque calculator 1 may be configured to multiple the actual deceleration of the vehicle by the equivalent inertia to convert the actual deceleration into the actual deceleration torque.

An error calculator 15 may be configured to calculate in real-time a torque error which is a difference value between the target deceleration torque and the actual deceleration torque. A torque corrector 16 may be configured to perform torque correction based on the torque error which is the difference value between the target deceleration torque and the actual deceleration torque. The torque correction process may correct an existing target regenerative braking torque (i.e., a target regenerative braking torque before correction) calculated based on the driver braking input or the vehicle state information using the torque error which is the difference value between the target deceleration torque and the actual deceleration torque. At this point, the torque corrector 16 may be configured to calculate the target regenerative braking torque which is corrected by adding the torque error to the existing target regenerative braking torque, and hereinafter, the target regenerative braking torque corrected with the torque error is referred to as a "post-correction target regenerative braking torque."

In the present invention, the post-correction target regenerative braking torque determined by the torque corrector 16 of the vehicle controller 10 and a pre-correction regenerative braking torque (the existing target regenerative braking torque) may be respectively transmitted to the motor controller 30 and the brake controller 20 via a bi-directional controller area network (CAN) communication path. The post-correction target regenerative braking torque may be transmitted to the motor controller 30, and the pre-correction target regenerative braking torque may be transmitted to the brake controller 20.

The post-correction target regenerative braking torque transmitted from the vehicle controller 10 to the motor controller 30 becomes a motor torque command value for adjusting a regenerative braking torque of an actual motor 32. In particular, the motor controller 30 may be configured to receive the post-correction target regenerative braking torque value transmitted from the vehicle controller 10 as the motor torque command value to adjust the motor torque based on the received motor torque command value. In other words, the motor controller 30 may be configured to operate an inverter 31 based on the motor torque command value and execute a regenerative braking operation of the motor 32 to allow the motor 32 to generate the target regenerative braking torque, that is, the post-correction regenerative braking torque.

Further, the pre-correction target regenerative braking torque (e.g. the existing target regenerative braking torque) transmitted from the vehicle controller 10 to the brake controller 20 corresponds to the above-described execution amount of regenerative braking, and the brake controller 20 may be configured to distribute the braking force by applying the pre-correction target regenerative braking torque instead of the post-correction target regenerative braking torque to the execution amount of regenerative braking and then operate a hydraulic braking device 21 to generate a braking torque corresponding to the distributed amount of frictional braking (the distributed amount of hydraulic braking).

As described above, the vehicle controller 10 may be configured to transmit the post-correction target regenerative braking torque to the motor controller 30 as a control value for actually executing motor regenerative braking and may be configured to generate the regenerative braking torque that corresponds to the post-correction regenerative braking torque at the motor 32. Meanwhile, regardless of whether the vehicle controller 10 transmits the pre-correction target regenerative braking torque, which is the regenerative braking torque value for distributing the braking force, to the brake controller 20 to perform the correction, that is, similar to the related art, the hydraulic braking device 21 may be configured to generate a braking torque except for the existing target regenerative braking torque (e.g., the pre-correction target regenerative braking torque) from the total braking torque required by the user.

As described above, the motor regenerative braking may be adjusted using the post-correction regenerative braking torque, and the actual braking force distribution and the hydraulic braking control may be performed using the existing regenerative braking torque as the actual execution amount of regenerative braking. The regenerative braking may be adjusted with the corrected target value of the motor regenerative braking control whereas the hydraulic braking may be adjusted using an uncorrected target value. In particular, the above adjustment may be executed since when the brake controller 20 receives the corrected target value (the post-correction target regenerative braking torque) to adjust the hydraulic braking, the hydraulic braking control may intervene in a feedback loop.

The braking control method according to the present invention has been described with reference to the configuration in the vehicle controller (the HCU), and the braking control process according to the present invention will be described step by step with reference to the flowchart of FIG. 4. In particular, the method may first include determining whether an execution condition of a predetermined hydraulic braking error compensation logic is satisfied (S111), and the execution condition of the hydraulic braking error compensation logic may include a condition of a vehicle speed and a condition whether the hydraulic braking is used.

In other words, when the vehicle speed is within a predetermined range or is a low vehicle speed that is less than or equal to a predetermined set vehicle speed, and the hydraulic braking is used, the hydraulic braking error compensation logic may be set to be executed. When the execution condition is satisfied in the operation S111, the road gradient observation device 11 may be configured to estimate a road gradient and the deceleration determiner 12 may be configured to calculate a vehicle target deceleration and actual deceleration (S112).

Subsequently, determining whether a ratio of a regenerative braking force is 1 (S113) may be performed, and when the ratio of the regenerative braking force is 1, an equivalent inertia variation may be calculated using a value obtained from an equation of "target vehicle deceleration−actual deceleration" (S114). Further, when the ratio of the regenerative braking force is not 1 in the operation S113, a subsequent process may be performed, and the torque calculator 14 may be configured to first convert the vehicle target deceleration into a target deceleration torque and convert the actual vehicle deceleration into an actual deceleration torque (S115).

After the conversion to the torque is performed as described above, the error calculator 15 may be configured to calculate a torque error value using a value obtained from an equation of "target deceleration torque−actual deceleration torque" (S116), and subsequently, the torque corrector 16 may be configured to correct the target regenerative braking torque by the torque error (S117). In particular, the post-correction target regenerative braking torque may be determined as a value obtained by adding the torque error to a pre-correction target regenerative braking torque. Subsequently, the post-correction target regenerative braking torque may be transmitted from the torque corrector 16 of the vehicle controller 10 to the motor controller 30, and the pre-correction target regenerative braking torque may be transmitted to the brake controller 20 (S118). Consequently, the motor controller 30 may be configured to execute motor torque control converging on the post-correction target regenerative braking torque (S119).

Figure 4:
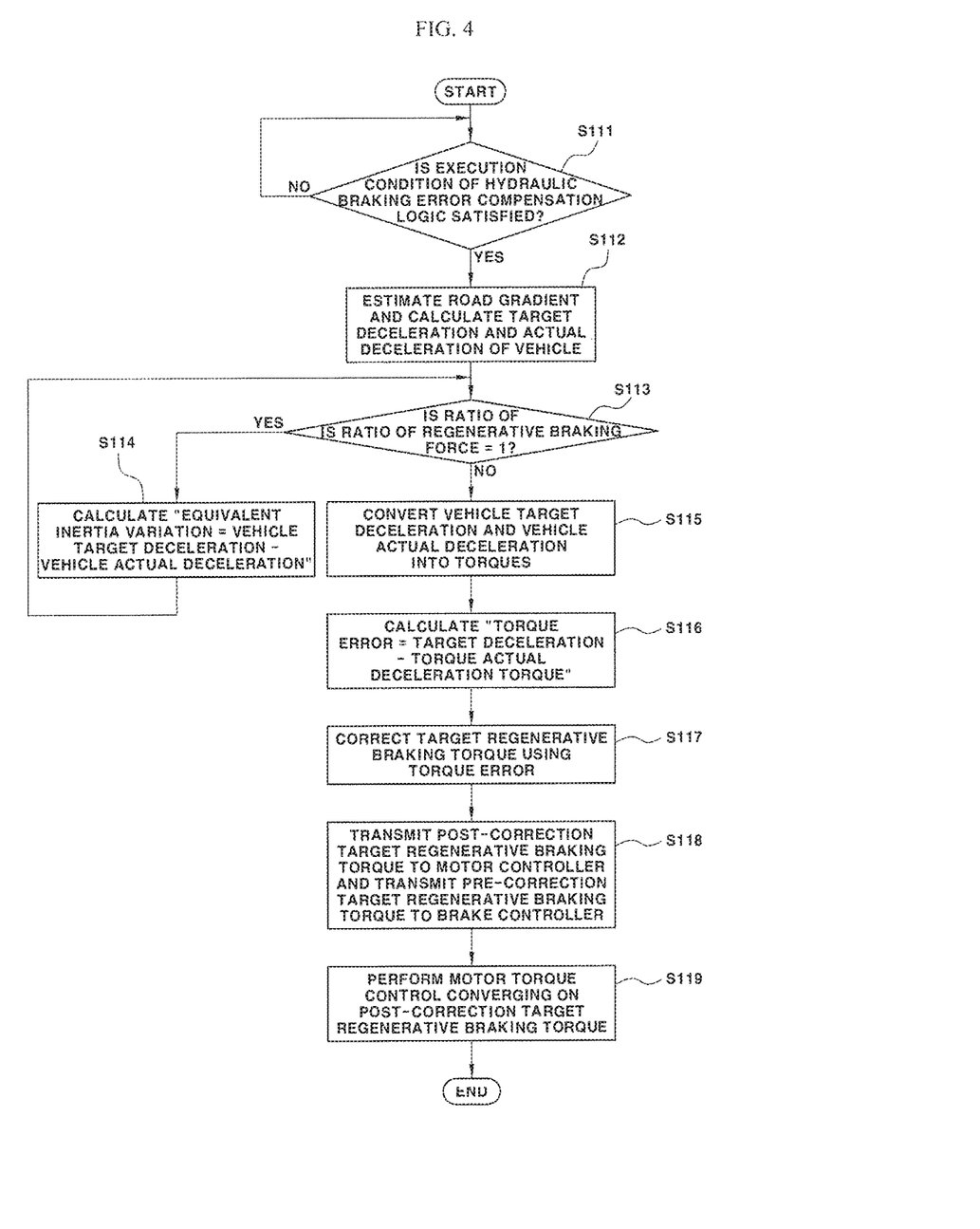
FIG. 4 is a flowchart of the braking control process according to an exemplary embodiment of the present invention.

Although not shown in FIG. 4, the brake controller 20 may be configured to perform braking force distribution using the pre-correction target regeneration braking torque and operate the hydraulic braking device 21 to generate a hydraulic braking torque that corresponds to a torque except for the pre-correction target regenerative braking torque from a total braking torque. Thus, in accordance with a braking control system and a braking control method for an eco-friendly vehicle according to the present invention, a regenerative braking torque of a motor may be adjusted to compensate for an error of hydraulic braking to reduce an impact when braking and deceleration and degradation of driving ability due to discrepancy in braking force may be prevented under a braking force cross situation.

Further, in accordance with the present invention, feedback for an environmental variable may be performed using a measured wheel speed value and a measured vehicle acceleration value and an error between an actual hydraulic braking torque and a target hydraulic braking torque may be compensated for in real-time through motor regenerative braking control, to thus perform a switching between regenerative braking and hydraulic braking (crossing of braking forces is performed) while maintaining constant deceleration of a vehicle without undesired discomfort deceleration. In accordance with the present invention, correction of a motor torque may be performed through feedback to compensate for an error of hydraulic braking such that a discomfort vehicle deceleration feel change, generation of an impact, an abrupt variation in a braking force, generation of discomfort braking feel, and degradation of driving ability may be prevented when deceleration.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A braking control system for an eco-friendly vehicle, comprising:
   a hybrid control unit (HCU) configured to determine target deceleration and actual deceleration of the eco-friendly vehicle based on information collected in the eco-friendly vehicle when braking;
   wherein the HCU is further configured to:
      calculate a target deceleration torque and an actual deceleration torque from the determined target deceleration and the determined actual deceleration of the eco-friendly vehicle using vehicle equivalent inertia information;
      calculate a torque error which is a difference value between the target deceleration torque and the actual deceleration torque;
      correct a pre-correction target regenerative braking torque by the calculated torque error and calculate a post-correction target regenerative braking torque; and
   a motor controller configured to adjust a regenerative braking torque of a motor according to the calculated post-correction target regenerative braking torque and operate the motor accordingly,
   wherein the HCU is configured to adaptively calculate equivalent inertia of the eco-friendly vehicle using real-time information collected in the eco-friendly vehicle, and
   wherein the HCU is configured to calculate the target deceleration torque of the eco-friendly vehicle by multiplying the determined target deceleration of the eco-friendly vehicle by vehicle equivalent inertia and calculate the actual deceleration torque of the eco-friendly vehicle by multiplying the determined actual deceleration of the eco-friendly vehicle by the vehicle equivalent inertia.

2. The braking control system of claim 1, wherein the HCU is configured to:
   acquire gradient information of a road on which the eco-friendly vehicle is being driven; and
   determine the target deceleration using a hydraulic braking torque command determined when braking, a regenerative braking torque command determined when braking, and the obtained gradient information of the road.

3. The braking control system of claim 2, wherein the HCU is a road gradient observation device configured to receive a measured longitudinal acceleration value measured by a longitudinal acceleration sensor and a measured wheel speed value measured by a wheel speed sensor and estimate a road gradient using the measured longitudinal acceleration value and the measured wheel speed value.

4. The braking control system of claim 1, wherein the HCU is configured to:
   adaptively calculate equivalent inertia of the eco-friendly vehicle using real-time information collected in the eco-friendly vehicle and
   determine the target deceleration using a hydraulic braking torque command determined when braking, a regenerative braking torque command determined when braking, and the vehicle equivalent inertia calculated by the HCU of the eco-friendly vehicle.

5. The braking control system of claim 1, wherein the HCU is configured to determine the actual deceleration of the eco-friendly vehicle from a measured value of the longitudinal acceleration sensor.

6. The braking control system of claim 1, wherein the HCU is configured to determine the actual deceleration of the eco-friendly vehicle from wheel acceleration obtained by differentiating a measured wheel speed value of the wheel speed sensor.

7. The braking control system of claim 1, wherein the real-time information collected in the vehicle includes the determined target deceleration and the determined actual deceleration of the eco-friendly vehicle.

8. The braking control system of claim 1, wherein, under a condition in which only a regenerative braking force is generated without generation of a hydraulic braking force to satisfy a total braking force requested by a driver, the HCU is configured to adaptively calculate the vehicle equivalent inertia.

9. The braking control system of claim 1, further comprising:
   a brake controller configured to operate a hydraulic braking device to generate a hydraulic braking torque obtained by subtracting the pre-correction target regenerative braking torque from a total braking torque required by the eco-friendly vehicle based on a brake pedal manipulation of a driver.

10. A braking control method for an eco-friendly vehicle, comprising:
    determining, by a controller, target deceleration and actual deceleration of the eco-friendly vehicle based on information collected in the eco-friendly vehicle when braking;
    calculating, by the controller, a target deceleration torque and an actual deceleration torque from the determined target deceleration and the determined actual deceleration of the eco-friendly vehicle using vehicle equivalent inertia information;
    calculating, by the controller, a torque error which is a difference value between the target deceleration torque and the actual deceleration torque;

correcting, by the controller, a pre-correction target regenerative braking torque by the calculated torque error and calculating a post-correction target regenerative braking torque;

adjusting, by the controller, a regenerative braking torque of a motor according to the calculated post-correction target regenerative braking torque and operating the motor accordingly; and adaptively calculating, by the controller, equivalent inertia of the eco-friendly vehicle using real-time information collected in the eco-friendly vehicle, wherein the target deceleration torque of the eco-friendly vehicle is calculated by multiplying the determined target deceleration of the eco-friendly vehicle by vehicle equivalent inertia, and wherein the actual deceleration torque of the eco-friendly vehicle is calculated by multiplying the determined actual deceleration of the eco-friendly vehicle by the vehicle equivalent inertia.

11. The braking control method of claim 10, further comprising:
acquiring, in a gradient information acquisition part, gradient information of a road on which the eco-friendly vehicle is traveling,
wherein the determining of the target deceleration of the eco-friendly vehicle determines the target deceleration using a hydraulic braking torque command determined when braking, a regenerative braking torque command determined when braking, and the obtained gradient information of the road.

12. The braking control method of claim 11, wherein the gradient information acquisition part is a road gradient observation device configured to receive a measured longitudinal acceleration value measured by a longitudinal acceleration sensor and a measured wheel speed value measured by a wheel speed sensor and estimate a road gradient using the measured longitudinal acceleration value and the measured wheel speed value.

13. The braking control method of claim 10, further comprising:
adaptively calculating, by the controller, equivalent inertia of the eco-friendly vehicle using real-time information collected in the eco-friendly vehicle,
wherein the determining of the target deceleration of the eco-friendly vehicle determines the target deceleration using a hydraulic braking torque command determined when braking, a regenerative braking torque command determined when braking, and the calculated vehicle equivalent inertia.

14. The braking control method of claim 10, wherein the actual deceleration of the eco-friendly vehicle is determined from a measured value of a longitudinal acceleration sensor.

15. The braking control method of claim 10, wherein the actual deceleration of the eco-friendly vehicle is determined from wheel acceleration obtained by differentiating a measured wheel speed value of the wheel speed sensor.

16. The braking control method of claim 10, wherein the real-time information collected in the vehicle includes the determined target deceleration and the determined actual deceleration of the eco-friendly vehicle.

17. The braking control method of claim 10, further comprising:
under a condition in which only a regenerative braking force is generated without generation of a hydraulic braking force to satisfy a total braking force requested by a driver, adaptively calculating, by the controller, the vehicle equivalent inertia.

18. The braking control method of claim 10, further comprising:
while adjusting the regenerative braking torque of the motor, operating, by the controller, a hydraulic braking device to generate a hydraulic braking torque obtained by subtracting the pre-correction target regenerative braking torque from a total braking torque required by the eco-friendly vehicle according to a brake pedal manipulation of a driver.

* * * * *